United States Patent
Akutsu

(10) Patent No.: US 9,789,789 B2
(45) Date of Patent: Oct. 17, 2017

(54) VEHICULAR SEAT

(71) Applicant: TS TECH CO., LTD., Asaka-shi, Saitama (JP)

(72) Inventor: Takeshi Akutsu, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/894,070

(22) PCT Filed: May 28, 2014

(86) PCT No.: PCT/JP2014/064163
§ 371 (c)(1),
(2) Date: Nov. 25, 2015

(87) PCT Pub. No.: WO2014/192824
PCT Pub. Date: Dec. 4, 2014

(65) Prior Publication Data
US 2016/0144748 A1 May 26, 2016

(30) Foreign Application Priority Data

May 29, 2013 (JP) .................................. 2013-113000
May 29, 2013 (JP) .................................. 2013-113001
Jul. 1, 2013 (JP) .................................. 2013-138104

(51) Int. Cl.
*B60N 2/12* (2006.01)
*B60N 2/06* (2006.01)
(Continued)

(52) U.S. Cl.
CPC ................ *B60N 2/12* (2013.01); *B60N 2/06* (2013.01); *B60N 2/3013* (2013.01);
(Continued)

(58) Field of Classification Search
CPC .......... B60N 2/12; B60N 2/06; B60N 2/3013; B60N 2/3047; B60N 2/3065; B60N 2/43
See application file for complete search history.

(56) References Cited

FOREIGN PATENT DOCUMENTS

JP 2004249109 A * 9/2004
JP 2008-030657 A 2/2008
(Continued)

OTHER PUBLICATIONS

Office Action issued in related application JP 2013-113000, Aug. 29, 2017, with machine generated English Language translation, 7 pages.

*Primary Examiner* — Glenn Dayoan
*Assistant Examiner* — Melissa A Black
(74) *Attorney, Agent, or Firm* — Drinker Biddle & Reath LLP

(57) ABSTRACT

A vehicular seat capable of housing a seat back and a seat cushion connected to the seat back in a housing floor provided in a position lower than a vehicle body floor is described. The vehicular seat includes a support base connected to the vehicle body floor and to a lower end side of the seat back, a support leg having an upper end side mounted to the seat cushion and a lower end side connectable to the support base, and a leg holding member mounted to the support base and that detachably holds the lower end side of the support leg. The seat back is connected to the support base via right and left connecting brackets disposed on sides of the seat back and having first end sides mounted to corresponding lower end sides of the seat back and second end sides pivotally connected to the support base.

15 Claims, 9 Drawing Sheets

(51) Int. Cl.
*B60N 2/30* (2006.01)
*B60N 2/42* (2006.01)

(52) U.S. Cl.
CPC ......... *B60N 2/3047* (2013.01); *B60N 2/3065* (2013.01); *B60N 2/43* (2013.01)

(56) References Cited

FOREIGN PATENT DOCUMENTS

| | | |
|---|---|---|
| JP | 2009-067309 A | 4/2009 |
| JP | 2009-067345 A | 4/2009 |
| JP | 2010-046162 A | 3/2010 |
| JP | 2011-143816 A | 7/2011 |
| WO | WO 2009/104586 A1 | 8/2009 |

* cited by examiner

<HOUSING OPERATION OF SEAT>

<HOUSING OPERATION OF SEAT>

<TIP-UP OPERATION OF SEAT>

<TIP-UP OPERATION OF SEAT>

<RETURN OPERATION OF SEAT>

<RETURN OPERATION OF SEAT>

VEHICULAR SEAT

CROSS REFERENCE TO RELATED APPLICATIONS

This application is a National Stage Entry application of PCT Application No. PCT/JP2014/064163, filed May 28, 2014, which claims the priority benefit of Japanese Patent Application No. 2013-113000, filed May 29, 2013, Japanese Patent Application No. 2013-113001, filed May 29, 2013, and Japanese Patent Application No. 2013-138104, filed Jul. 1, 2013, the contents of each of which are incorporated herein by reference in their entireties.

BACKGROUND

The present disclosure relates to a vehicular seat and, more specifically, to a vehicular seat capable of housing a seat back and a seat cushion in a housing floor formed at a position lower than a vehicle body floor.

Conventionally, vehicular seats capable of housing a seat back and a seat cushion which include a seat body in a housing floor formed at a position lower than a vehicle body floor are already known, and of them, vehicular rear seats capable of housing a seat body to be folded forward in a housing floor provided in front of the seat exist, for example, see Japanese Patent Document 2009-67309 A (referred to herein as "the '309 Document").

The vehicular seat described in the '309 Document includes a housing structure having a mounting shaft mounted to a vehicle body floor and pivotally supporting a seat back, and a leg member whose upper end supports a front portion of a seat cushion and whose lower end is pivotally held in a holding groove fixed to a housing floor. At the time of a housing operation of a seat body, the seat back rotates to move the seat cushion to the housing floor with respect to the vehicle body floor, and the retractable leg member rotates around the holding groove in conjunction with the seat back, thereby capable of housing the seat body in the housing floor. In addition, the vehicular seat is configured to be capable of switching from a "seatable" state, in which an occupant can sit thereon, to a "tip-up" state, in which the seat cushion is flipped up after detaching the retractable leg member from the holding groove.

However, in the seat capable of housing the seat body in the housing floor as described in '309 Document, component parts such as the leg member and the holding groove for supporting the seat back rotatably are mounted not only on the vehicle body floor surface on which the seat body is installed but also on the housing floor surface, which complicated the housing structure for housing the seat body. In particular, the holding groove holding the lower end portion of the leg member is fixed to the housing floor, and the total length of the leg member supporting the seat cushion is increased, so consideration was required for increasing support rigidity of the seat cushion, the leg member, and the holding groove which receive the seating load of a seated person. Therefore, a vehicular seat capable of being housed in a housing floor which has a simple structure and in which support rigidity of a seat body is increased is desirable. In addition, a vehicular seat capable of securing a wide housing space is desirable.

In addition, in the seat as described in the '309 Document, the leg member supporting the seat cushion was a long member because of being connected between the seat cushion and the housing floor. Therefore, when attaching and detaching the leg member to and from the holding groove in a switching operation of a seatable state and a tip-up state, the deflection width in the front to back direction of the detached leg member is increased due to a long total length of the leg member, so an operation of attaching the leg member to the holding groove is made difficult. Thus, a vehicular seat in which a switching operation from a seatable state is simplified is desirable.

Further, in the seat capable of switching the seat body from the seatable state, a technique capable of stably maintaining the seat body in the seatable state even if an inertial force is applied to the seat body in association with a front end collision or a rear end collision of a vehicle is desirable.

SUMMARY

The present disclosure is discussed in consideration of the above problems, and various embodiments described herein provide a vehicular seat capable of being housed in a housing floor which has a simple structure and in which support rigidity of a seat body is increased. In addition, at least some embodiments of the present disclosure provide a vehicular seat capable of securing a wide housing space without disposing component parts of a housing structure on a housing floor surface. In addition, at least some embodiments of the present disclosure provide a vehicular seat in which a switching operation from a seatable state is easy. In addition, at least some embodiments of the present disclosure provide a vehicular seat capable of stably maintaining a seat body in a seatable state even if an inertial force is applied to the seat body at the time of a collision of a vehicle.

Various embodiments of the present disclosure, discussed below, have been made in view of the above-described problems, and provide a vehicular seat capable of housing a seat back and a seat cushion connected to the seat back in a housing floor formed at a position lower than a vehicle body floor, including a support base connected to the vehicle body floor and to which a lower end side of the seat back is connected, a support leg having an upper end side mounted to the seat cushion and a lower end side connectable to the support base, and a leg holding member that i) is mounted to the support base, and ii) detachably holds the lower end side of the support leg, wherein the seat back is connected to the support base via right and left connecting brackets respectively disposed on right and left sides of the seat back, each of the right and left connecting brackets having a first end side mounted to a corresponding lower end side of the seat back and a second end side pivotally connected to the support base.

According to the above configuration, by a generally simple structure including the support base connected to the vehicle body floor side and supporting the seat back via the connecting brackets, the support leg supporting the seat cushion, and the leg holding member mounted to the support base and detachably holding the lower end side of the support leg, without providing any component parts on the housing floor, it is possible to provide the vehicular seat capable of housing the seat back and the seat cushion which constitute a seat body in the housing floor. In addition, the leg holding member is mounted on the support base, which is connected to the vehicle body floor and is capable of supporting the seat back via the connecting bracket and has relatively high support rigidity, so support rigidity of the leg holding member and the support leg is increased. As a result, it is possible to increase support rigidity of the seat body. In addition, the support base, the support leg, and the leg holding member which serve as component parts of a housing structure are all disposed on the vehicle body floor, so it is possible to provide a wider housing space on the housing floor. In addition, the leg holding member is disposed on the vehicle body floor rather than the housing floor, and as a result, it is possible to reduce a total length of the support leg. A deflection width in a front to back direction of the support leg is reduced by a fraction of the total length of the support leg, so the support leg is more easily held by the leg holding member. Consequently, a vehicular seat in which a switching operation from a seatable state is more easily performed is provided.

The support base may include right and left side base portions to which the right and left connecting brackets are respectively mounted, a first base connection portion that connects the right and left side base portions, and a second base connection portion that connects the right and left side base portions at a position behind the first base connection portion, and the leg holding member is disposed between the first base connection portion and the second base connection portion in a front to back direction of the vehicular seat. According to the above configuration, support rigidity of the leg holding member is increased, and support rigidity of the seat body is increased.

Then, the first base connection portion and the second base connection portion may extend in a seat width direction and be disposed substantially parallel to each other. According to the above configuration, the first base connection portion and the second base connection portion which constitute the support base can be compactly disposed, and it is possible to reduce a size of the vehicular seat.

Then, the support base may include a holding member support portion which extends in the front to back direction of the vehicular seat to connect the first base connection portion and the second base connection portion and to which the leg holding member is mounted. According to the above configuration, support rigidity of the leg holding member is increased, and support rigidity of the seat body is increased.

Then, the support base may include right and left reinforcing base portions respectively mounted on upper sides of the right and left side base portions, and the right and left side base portions and the right and left reinforcing base portion may form respective closed section structures. According to the above configuration, support rigidity of the support base is increased, and support rigidity of the seat body is increased.

Then, the support base may include a plurality of base mounting portions that mount the right and left side base portions and the right and left reinforcing base portions, and the right and left reinforcing base portions include respective right and left convex portions that project in an up and down direction of the vehicular seat and may be disposed in portions of the right and left reinforcing base portions located between the plurality of base mounting portions. According to the above configuration, mounting rigidity of the plurality of base mounting portions mounting the side base portions and the reinforcing base portions is increased.

Then, the right and left reinforcing base portions may sandwich the first base connection portion and the second base connection portion with the right and left side base portions, and the right and left reinforcing base portions may include respective protrusions that project in the up and down direction along an outer surface of the second base connection portion and are disposed in a portion of the right and left reinforcing base portions in contact with the second base connection portion, and the right and left protrusions may extend to an outer end portion of a seat width direction. According to the above configuration, connection rigidity of the reinforcing base portion and the second base connection portion is increased.

Then, the right and left side base portions may be connected to a lower portion of the first base connection portion, and the right and left reinforcing base portions may be connected to an upper portion of the first base connection portion. According to the above configuration, the side base portions and the reinforcing base portions are disposed at positions different from each other in a connecting portion with the first base connection portion, so assembly is facilitated as compared to the case where they are disposed at positions overlapping with each other, for example.

Then, the right and left protrusions of the right and left reinforcing base portions may extend to a position that does not overlap with the leg holding member in the seat width direction. According to the above configuration, the support base having the reinforcing base portion as a component part and the support leg detachably held by the leg holding member are disposed without interfering with each other.

Then, a back pivot axis that serves as a pivot axis of the seat back may be pivotally supported on the support base in a seat width direction, the back pivot axis may be connected to the lower end side of the seat back by the right and left connecting brackets and pivotally supported on the right and left reinforcing base portions in the seat width direction, a side base portion of the right and left side base portions may be disposed outside in the seat width direction of a reinforcing base portion of the right and left side base portions, and the side base portion has a notch in a portion of the side base portion that faces the back pivot axis. According to the above configuration, assembling performance is improved in assembling the back pivot axis from a side surface side of the seat.

Then, right and left lower rails may be fixed to the vehicle body floor and may extend in a front to back direction of the vehicular seat, and right and left upper rails may be slidably supported along the lower rails, wherein the support base may be disposed between the right and left upper rails and a back pivot axis that serves as a pivot axis of the seat back may be mounted thereto. As described above, the leg holding member is constructed between the right and left upper rails provided on the vehicle body floor and mounted on the support base having relatively high support rigidity, so support rigidity of the leg holding member and the support leg is increased.

Then, the leg holding member may be disposed behind in the front to back direction of the vehicular seat as compared to front end portions of the right and left upper rails. According to the above configuration, a space can be secured on the lower side of the seat cushion and in the seat front side of the leg holding member and the support leg, and a seated person can bend and stretch the foot relatively freely.

Then, a locking device mounted within the vehicular seat and configured to lock the support leg in a state of being held by the leg holding member may be provided. According to the above configuration, the locking device capable of locking the support leg in a state of being held by the leg holding member is provided, so a vehicular seat capable of stably maintaining the seat body in the seatable state is provided. Further, the locking device is mounted within the vehicular seat rather than on the vehicle body floor, so the locking device can be equipped only by assembling the seat to the vehicle body, which results in a simple structure.

Then, the locking device may be mounted to the support base and may be disposed between a front end and a rear end of the support base. According to the above configuration, the locking device is mounted to the support base having relatively high support rigidity for the vehicular seat and is compactly disposed in the front to back direction of the seat.

Then, the support base may include right and left side base portions which are disposed on sides of the seat back and to which lower end sides of the seat back are connected, a first base connection portion that connects the right and left side base portions, and a second base connection portion that connects the right and left side base portions at a position behind the first base connection portion, and the locking device may be disposed between the first base connection portion and the second base connection portion. According to the above configuration, the locking device is mounted to a portion having relatively high support rigidity of the support base, and mounting rigidity of the locking device is increased.

In at least some embodiments of the present disclosure, a vehicular seat capable of housing a seat body in a housing floor by a simple structure not providing any component parts on the housing floor is provided. In addition, a leg holding member is mounted on a support base having relatively high support rigidity, so support rigidity of the leg holding member and a support leg is increased. As a result, it is possible to increase support rigidity of the seat body. In addition, it is possible to secure a wide housing space on the housing floor. In addition, the leg holding member is disposed on a vehicle body floor rather than the housing floor, and as a result, it is possible to reduce the total length of the support leg. A deflection width in the front to back direction of the support leg is reduced by a degree of smallness of the total length of the support leg, so the support leg is easily held by the leg holding member. Consequently, a vehicular seat in which a switching operation from a seatable state is easy is provided.

In some embodiments, support rigidity of the leg holding member and the support base is increased, and support rigidity of the seat body is increased. In some embodiments, the support base can be compactly disposed, and it is possible to reduce the size of the vehicular seat.

In some embodiments, assembly of the support base is facilitated, and moreover, assembling performance is improved in assembling a back pivot axis from the side surface side of the seat. According to the above configuration, the support base and the support leg are disposed without interfering with each other.

In some embodiments, the leg holding member is constructed between right and left upper rails provided on the vehicle body floor and mounted on the support base having relatively high support rigidity, so support rigidity of the leg holding member and the support leg is increased. In some embodiments, a space can be secured on the lower side of a seat cushion and in the seat front side of the leg holding member and the support leg, and a seated person can bend and stretch the foot relatively freely.

In some embodiments, a locking device capable of locking the support leg in a state of being held by the leg holding member is provided, so a vehicular seat capable of stably maintaining the seat body in the seatable state is provided. Further, the locking device is mounted within the vehicular seat, so the locking device can be equipped only by assembling the seat to the vehicle body, which results in a simple structure. In some embodiments, the locking device is mounted to the support base having relatively high support rigidity and is compactly disposed in the front to back direction of the seat.

BRIEF DESCRIPTION OF DRAWINGS

Various embodiments of the invention are illustrated in the drawings, in which.

DETAILED DESCRIPTION

The present disclosure relates to a vehicular seat capable of housing a seat body in a housing floor, including a support base mounted on a vehicle body floor side and supporting a seat back via a connecting bracket, in which the seat back is rotatable around a back pivot axis mounted to the support base to move a seat cushion to the housing floor side, and to the support base, a leg holding member detachably holding the lower end of a support leg supporting the seat cushion is mounted. In the description below, the side on which an occupant sits with respect to the seat back of the vehicular seat is referred to as a seat front side.

Figure 1:
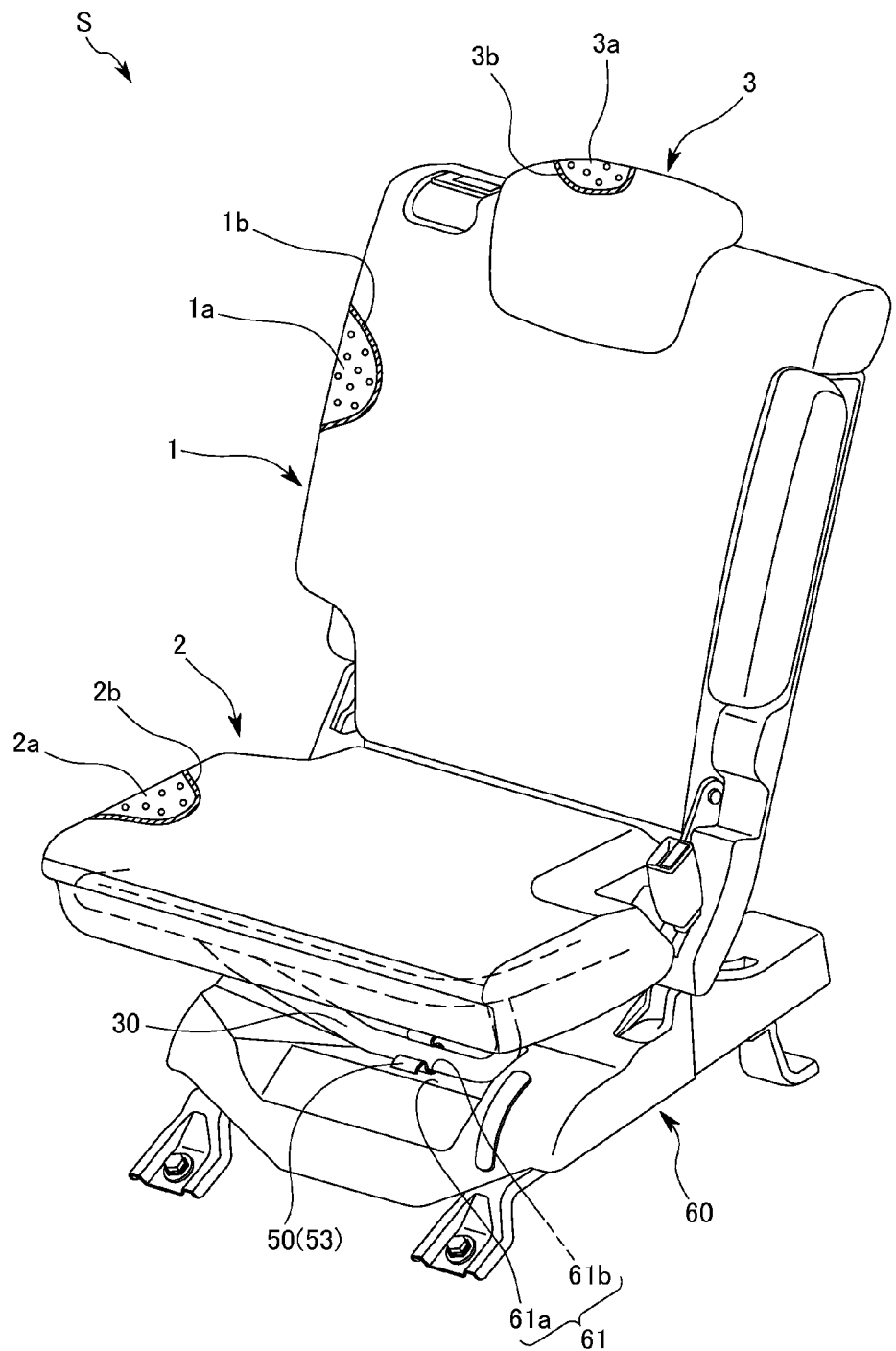
FIG. 1 is a perspective view of a vehicular seat, according to an embodiment.
Figure 2:
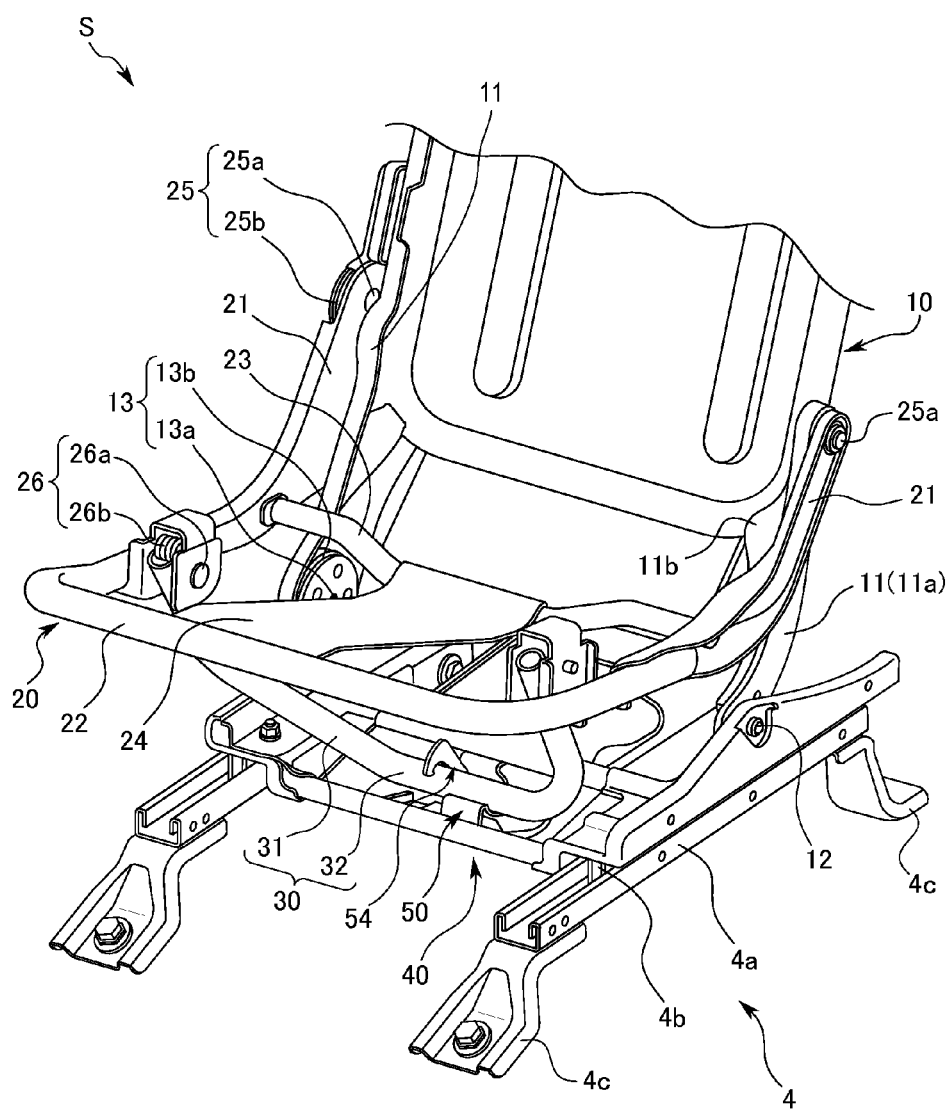
FIG. 2 is a partial, perspective view of a seat frame serving as a framework of the vehicular seat.

A vehicular seat S of the present embodiment is, for example, a rear seat corresponding to a backseat of a vehicle. The vehicular seat is also available as a middle seat in a second row in a vehicle including three rows of seats in a front to back direction of the vehicle. The vehicular seat S includes a seat body including a seat back 1, a seat cushion 2, and a headrest 3, as shown in FIG. 1, right and left rail devices 4 mounted to a vehicle body floor and supporting the seat body in a movable state in the front to back direction, a support leg 30 mounted between the seat body and the rail devices 4 and supporting the seat cushion 2, a support base 40 pivotally supporting the seat back 1, and a leg holding member 50 mounted to the support base 40 and detachably holding the support leg 30, as shown in FIG. 2. In addition, a reclining device 13 connecting the seat back 1 to the support base 40 pivotally, a cushion locking device 25 connecting the seat cushion 2 to the seat back 1 pivotally, and an inertial locking device 54 capable of locking the support leg 30 in a state of being held by the leg holding member 50 are mounted to the vehicular seat S. As shown in FIG. 7, on the front side of the vehicular seat S, a concave housing floor formed at a position lower than the vehicle body floor is provided.

The vehicular seat S is capable of seat arrangements in three states: in a "seatable" state in which the occupant can sit; a "housed" state in which the seat body is housed in the housing floor; and a "tip-up" state in which the seat body is flipped up. The vehicular seat S is switched from the seatable state shown in FIG. 7A to the housed state shown in FIG. 8C in which the seat body falls forward and is folded and housed in the housing floor when the occupant pulls an operating lever (not shown). In addition, the occupant raises the seat body upward manually, thereby the vehicular seat S is switched from the housed state to the tip-up state shown in FIG. 9B. Further, when the occupant pulls the support leg 30 functioning as the operating lever, the seat cushion 2 rotates downwardly from the seat with respect to the seat back 1, and the vehicular seat S returns to the seatable state from the tip-up state. The details are described below.

As shown in FIG. 1, the seat back 1 is a backrest portion that supports the back of an occupant from behind, and is configured by placing a cushion pad 1a on a back frame 10 serving as a framework shown in FIG. 2 and covering them with a skin 1b. The seat cushion 2 is a seating portion that supports the occupant from below, and is configured by placing a cushion pad 2a on a cushion frame 20 serving as a framework shown in FIG. 2 and covering them with a skin 2b from above the cushion pad 2a. The headrest 3 is a head portion supporting a head of the occupant from behind, and is configured by placing a cushion pad 3 on a pillar (not shown) serving as a core material and covering them with a skin 3b.

The rail devices 4 are arranged between the seat body and the vehicle body floor in an up and down direction of the vehicular seat, and as shown in FIG. 2, are composed of right and left lower rails 4a fixed to the vehicle body floor and extending in the front to back direction of the vehicular seat, and right and left upper rails 4b slidably supported along the lower rails 4a. On the bottom surfaces of the right and left lower rails 4a, lower rail fixed portions 4c for fixing them to the vehicle body floor are mounted respectively to the front and rear, and on the upper surfaces of the right and left upper rails 4b, the support base 40 is constructed. On the rail devices 4, a locking member (not shown) locking the upper rails 4b so as not to slide and an operating lever (not shown) releasing the locked state of the locking member are mounted.

The back frame 10 includes a substantially rectangular frame body serving as a framework of the seat back 1, and as shown in FIG. 2, on the right and left outer surfaces which are in the lower portion of the back frame 10, right and left connecting brackets 11 for connecting it to the support base 40 are mounted. The connecting brackets 11 are formed of a sheet metal member extending in the up and down direction and formed into a generally arcuate shape when seen from the side surface side of the seat, and the upper end portion of the connecting bracket 11 is mounted to the back frame 10 and the lower end portion thereof is mounted to the support base 40. As shown in FIG. 2, the connecting bracket 11 is composed of outer bracket portions 11a having a substantially channel-shaped transverse section disposed on the right and left outer sides, and inner bracket portions 11b having a substantially channel-shaped transverse section disposed on the right and left inner sides of the outer bracket portions 11a, and the outer bracket portions 11a and the inner bracket portions 11b form a closed section structure by partially overlapping to have a substantially square shaped transverse section.

The upper end portions of the connecting brackets 11 are disposed in the right and left direction of the seat while being sandwiched between the back frame 10 and the cushion frame 20. On the lower end portion of the left connecting bracket 11, a back pivot axis 12 pivotally supported on the support base 40 in the right and left direction is provided, and on the lower end portion of the right connecting bracket 11, a reclining device 13 is mounted that pivotally connects the back frame 10 to the support base 40.

Figure 3:
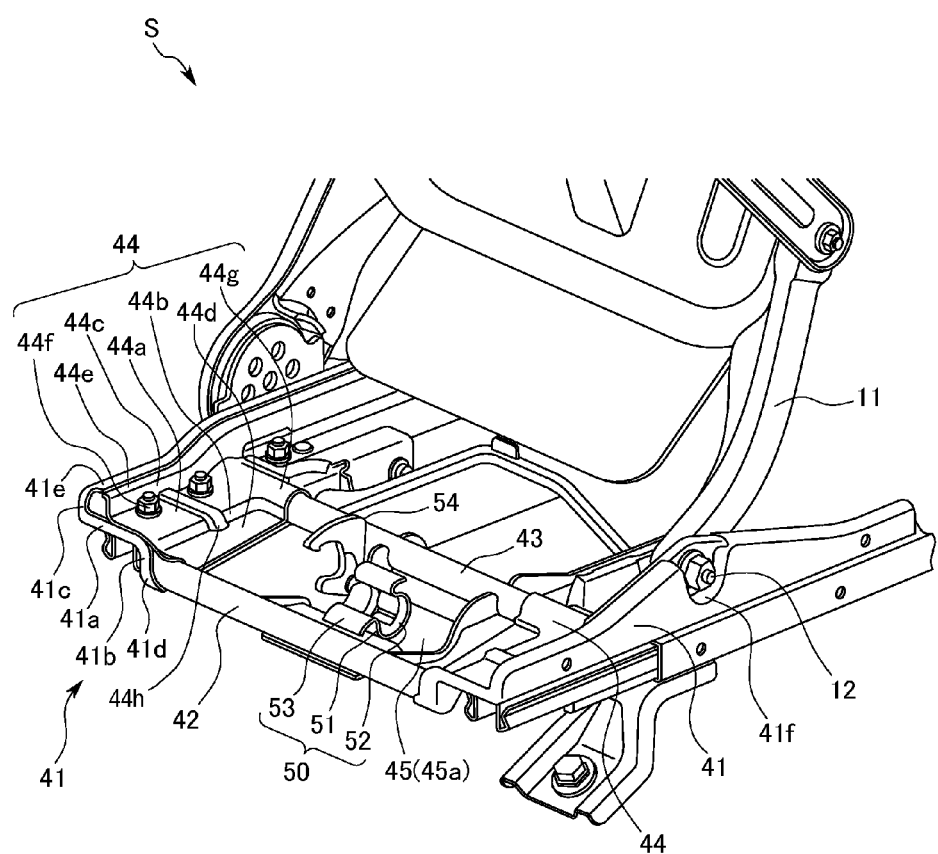
FIG. 3 is a perspective view of the seat frame, and is an enlarged partial view thereof.

As shown in FIG. 2, the back pivot axis 12 is disposed between the front lower rail fixed portion 4c and the rear lower rail fixed portion 4c even when the upper rails 4b slide to the rearmost side of the lower rails 4a, thereby securing support rigidity of the seat body. In addition, as shown in FIG. 3, the back pivot axis 12 is disposed behind the front lower rail fixed portion 4c even when the upper rails 4b slide to the foremost side of the lower rails 4a, thereby securing support rigidity of the seat body.

The reclining device 13 comprises a known device, and as shown in FIG. 2, is disposed on the right and left inner surfaces of the connecting brackets 11 and suppresses interference with the cushion frame 20 in the right and left directions. The reclining device 13 includes a back pivot axis 13a and a spiral spring 13b that rotates the back frame 10 around the back pivot axis 13a forwardly and biasing it into the housed state. The back pivot axis 13a is pivotally supported on the back frame 10 side and the support base 40 side in the right and left direction, and the spiral spring 13b is locked on the side of the back frame 10 at one end portion thereof and is locked on the side of the support base 40 at the other end portion thereof. The reclining device 13 can be switched to a locked state in which the pivot motion of the back frame 10 is locked, the back frame 10 is locked to a rising state, the locked state is released by operating the operating lever (not shown), and the back frame 10 can be rotated forwardly by a biasing force of the spiral spring 13b and be folded to the support base 40 side.

The cushion frame 20 includes a substantially rectangular frame body serving as a framework of the seat cushion 2, and as shown in FIG. 2, includes right and left side frames 21 disposed on the right and left sides, a front connecting pipe 22 connecting front portions of the respective side frames 21, a central connecting pipe 23 connecting substantially central portions in the front to back direction of the respective side frames, and a pan frame 24 as a plate-shaped frame connecting the front connecting pipe 22 and the central connecting pipe 23. The side frame 21 is formed of a sheet metal member extending in the front to back direction, the front portion thereof is connected to the front connecting pipe 22, and to the upper end portion which is the rear portion thereof, a cushion locking device 25 connecting the cushion frame 20 to the back frame 10 pivotally is mounted. On the outer edge portion of the side frame 21 as seen from the side surface side of the seat, a flange portion (not shown) bent to the right and left outer sides is formed, thereby increasing support rigidity of the front connecting pipe 22 and the back frame 10.

The cushion locking device 25 comprises a known device, and as shown in FIG. 2, includes a cushion pivot axis 25a, and a spiral spring 25b biasing the cushion frame 20 downwardly around the cushion pivot axis 25a. The cushion pivot axis 25a is pivotally supported on the back frame 10 and the cushion frame 20 in the right and left direction, and the spiral spring 25b is locked on the side of the back frame 10 at one end portion thereof and is locked on the side of the cushion frame 20 at the other end portion thereof. The cushion locking device 25 can be switched to a locked state in which the pivot motion of the cushion frame 20 is locked. As shown in FIG. 8C, when the seat body is housed in the housing floor, for example, when the back frame 10 is in a state of being folded to the cushion frame 20 side, the cushion locking device 25 locks the pivot motion of the cushion frame 20. Then, as shown in FIG. 10, the locked state is released when the support leg 30 functioning as an operating lever is pulled, and the cushion frame 20 can be rotated downwardly with respect to the back frame 10 by a biasing force of the spiral spring 25b.

Figure 6A:
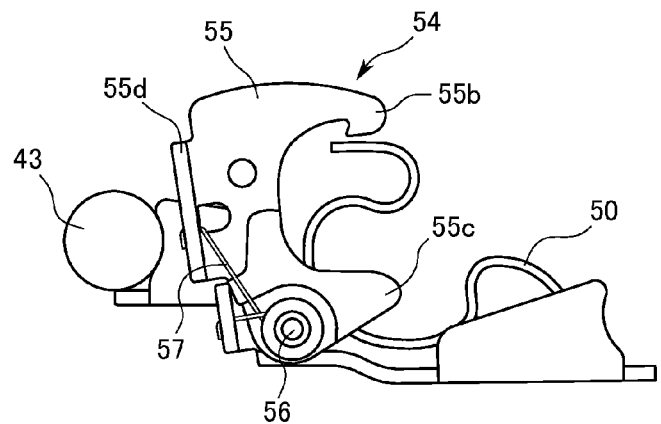
FIGS. 6A and 6B are side views illustrating a switching operation of an engaging hook of the inertial locking device between an engaged position shown in FIG. 6A and a disengaged position shown in FIG. 6B.

As shown in FIG. 2, the front connecting pipe 22 is formed of a substantially channel-shaped pipe member, and on the right and left inner surfaces, a leg locking device 26 connecting the support leg 30 to the cushion frame 20 pivotally is mounted. The leg locking device 26 includes a leg pivot axis 26a, and a spring member 26b biasing the support leg 30 to the opposite side to the cushion frame 20 around the leg pivot axis 26a, in other words, to the direction away from the cushion frame 20. The leg pivot axis 26a is pivotally supported in the right and left direction on the front connecting pipe 22 and the upper end portion of the support leg 30, and the spring member 26b is locked on the cushion frame 20 side at one end portion thereof and is locked on the support leg 30 side at the other end portion thereof. The leg locking device 26 can be switched to a locked state in which the pivot motion of the support leg 30 is locked, and when in a housed state, for example, when the support leg 30 is detached from the leg holding member as shown in FIG. 6A, locks the pivot motion of the support leg 30. Then, as shown in FIG. 8, the locked state is released when the locked support leg 30 is pulled, and the support leg 30 can be moved to a position in which it can be attached to the leg holding member 50 to return to the seatable state by a biasing force of the spring member 26b.

Figure 4:
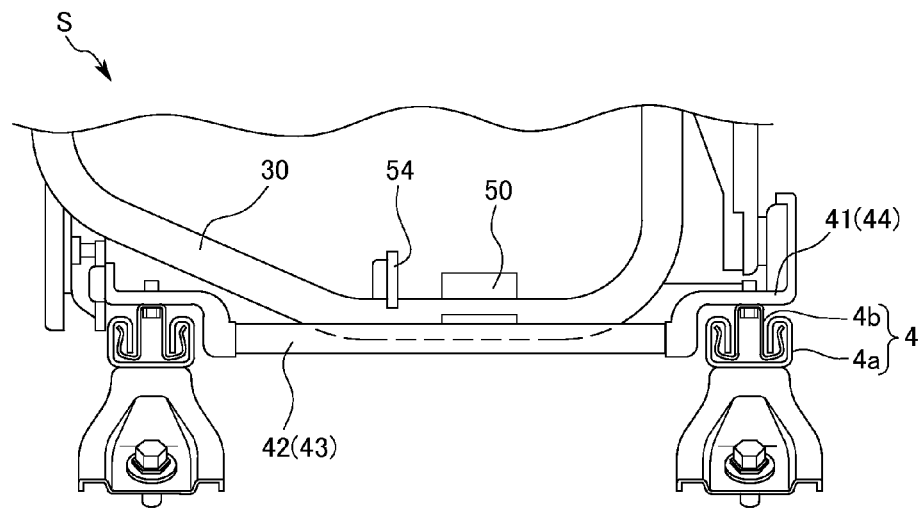
FIG. 4 is a front view of the seat frame, and is an enlarged partial view thereof.

As shown in FIG. 2, the support leg 30 is a substantially channel-shaped pipe member supporting the seat cushion 2, and includes leg body portions 31 disposed on the right and left sides, and a leg connection portion 32 connecting the lower end portions of the respective leg body portions 31. The upper end portions of the leg body portions 31 are connected to the right and left inner surfaces of the cushion frame 20 which are in the substantially central portion in the front to back direction, and the substantially central portion in the right and left direction of the leg connection portion 32 is detachably held by the leg holding member 50. The lower end of the support leg 30 is disposed below the upper ends of the lower rails 4a, as shown in the front view of FIG. 4.

The support base 40 is a member that supports the seat back 1, and as shown in FIG. 3, includes right and left side base portions 41 disposed on the right and left sides along the upper rails 4b, a first base connection portion 42 connecting the front portions of the respective side base portions 41, a second base connection portion 43 connecting the substantially central portions of the respective side base portions 41, right and left reinforcing base portions 44 mounted to the upper surfaces of the respective side base portions 41, and a holding member support portion 45 connecting the first base connection portion 42 and the second base connection portion 43 and supporting the leg holding member 50. The support base 40 is covered with a base cover 60 shown in FIG. 1 from above.

The side base portion 41 is formed of a substantially eccentric-shaped sheet metal member elongated in the front to back direction, and as shown in FIG. 3, is mainly composed of a connecting wall portion 41a connected to the upper surfaces of the upper rails 4b, an inner wall portion 41b bent downwardly from the right and left inner end portions of the connecting wall portion 41a, and an outer wall portion 41c bent upwardly from the right and left outer end portions of the connecting wall portion 41a. For the side base portion 41, on the lower end portion of the inner wall portion 41b and the upper end portion of the outer wall portion 41c, flange portions 41d, 41e folded to the right and left inner sides are formed respectively. In addition, of the left side base portion 41, in a portion facing the back pivot axis 12 seen from the side surface side of the seat, a notch 41f is formed, so assembly of the back pivot axis 12 to the connecting brackets 11, the reinforcing base portions 44, and the side base portions 41 from the side surface side of the seat is facilitated. The notch 41f is notched into a substantially semicircular shape downwardly from the upper surfaces of the side base portions 41.

The size of the side base portion 41 is formed larger than the size of the reinforcing base portion 44 in the front to back and seat width direction, and the front end portion and the rear end portion of the side base portion 41 project to the front and rear outer sides further than the front end portion and the rear end portion of the reinforcing base portion 44 respectively. The side base portions 41 near to the vehicle body floor are larger than the reinforcing base portions 44, thereby increasing support rigidity of the support base 40 and increasing support rigidity of the seat body.

As shown in FIG. 3, the first base connection portion 42 and the second base connection portion 43 are formed of a substantially semicircular pipe member extending in the right and left direction, are separated from each other with a predetermined distance in the front to back direction, and are disposed substantially in parallel in the right and left direction. In addition, the first base connection portion 42 and the second base connection portion 43 are disposed at positions overlapping with the lower rails 4a and the upper rails 4b in the up and down direction as shown in the front view of FIG. 4.

As shown in FIG. 3, the reinforcing base portion 44 is formed of a substantially eccentric-shaped sheet metal member elongated in the front to back direction, and is mainly composed of a connecting wall portion 44a connected to the upper surfaces of the side base portions 41, an inner wall portion 44b bent downwardly from the right and left inner end portions of the connecting wall portion 44a, and an outer wall portion 44c bent upwardly from the right and left outer end portions of the connecting wall portion 44a. For the reinforcing base portion 44, on the lower end portion of the inner wall portion 44b, a flange portion 44d folded to the right and left inner sides is formed, and on the upper end portion of the outer wall portion 44c, a flange portion 44e folded to the right and left outer sides is formed.

As shown in FIG. 3, the respective right and left end portions of the first base connection portion 42 and the second base connection portion 43 are connected to the side base portions 41 and the reinforcing base portions 44, to be sandwiched therebetween. Specifically, the first base connection portion 42 is connected to the inner wall portion 41b and the flange portion 41d of the side base portion 41, and the flange portion 44d of the reinforcing base portion 44 to be surrounded by them. In addition, the second base connection portion 43 is connected to the inner wall portion 41b and the flange portion 41d of the side base portion 41, and the connecting wall portion 44a and the inner wall portion 44b of the reinforcing base portion 44 to be surrounded by them. In other words, the side base portions 41 are connected to the lower portions of the first base connection portion 42 and the second base connection portion 43, the reinforcing base portions 44 are connected to the upper portions of the first base connection portion 42 and the second base connection portion 43, and the side base portions 41 and the reinforcing base portions 44 are disposed at positions that do not overlap with each other.

For the reinforcing base portion 44, on a portion in contact with the second base connection portion 43, a protrusion 44g projecting upwardly along the outer surface of the second base connection portion 43 is formed. The protrusion 44g is an elongated portion in the right and left direction, extends to the right and left outer end portions of the reinforcing base portion 44 toward the right and left outer sides, and on the other hand, extends to a position that does not overlap with the leg holding member 50 toward the right and left inner sides.

As shown in FIG. 3, the reinforcing base portions 44 are mounted to the side base portions 41 at a base mounting portion 44f of the connecting wall portion 44a, and is configured so that the flange portion 44e, and the flange portion 41e of the side base portion 41 overlap with each other in the up and down direction to form a closed section structure, thereby increasing support rigidity of the support base 40. In other words, the support base 40 is formed into a hollow shape. Therefore, support rigidity of the support base 40 is increased. For the reinforcing base portion 44, on a portion located between the plurality of base mounting portions 44f in the front to back direction, a convex portion 44h projecting upwardly is formed to extend in the right and left direction, thereby increasing mounting rigidity of the base mounting portions 44.

The left reinforcing base portion 44 is connected to the connecting brackets 11 and the side base portions 41 to be sandwiched therebetween in the right and left direction. The reinforcing base portions 44 are disposed at positions overlapping with the lower rails 4a and the upper rails 4b in the right and left direction as shown in the front view of FIG. 4.

Figure 5:
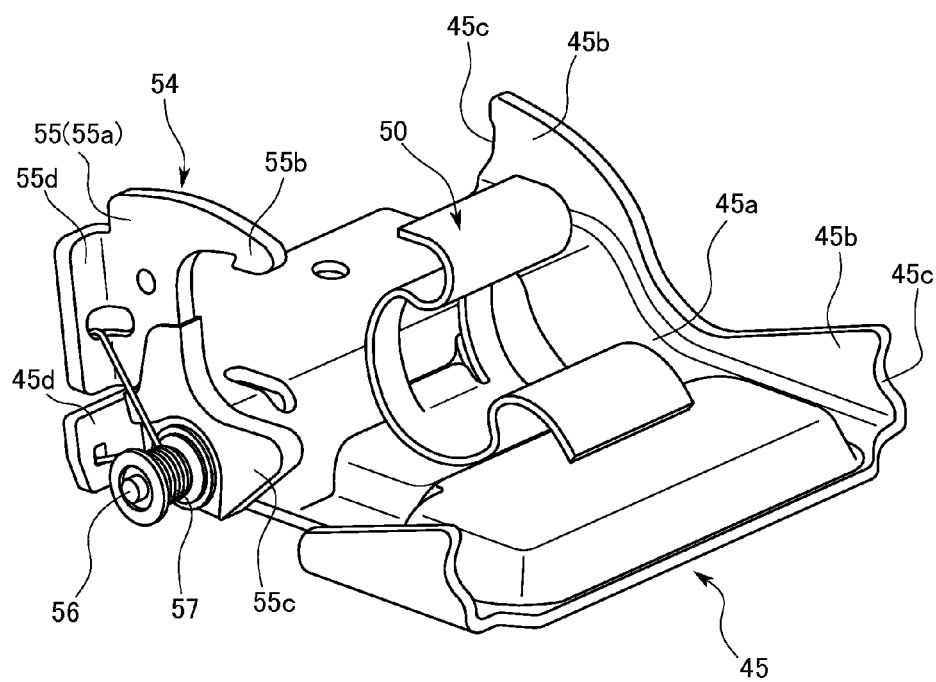
FIG. 5 is a perspective view of an inertial locking device of the vehicular seat.

As shown in FIG. 3 and FIG. 5, the holding member support portion 45 is a curved sheet metal member supporting the leg holding member 50, and is configured to extend in the front to back direction of the seat and to be mounted to the first base connection portion 42 and the second base connection portion 43. Then, of the holding member support portion 45, a portion to be mounted to the first base connection portion 42 and a portion to be mounted to the second base connection portion 43 are disposed at positions that overlap with each other in the right and left direction.

As shown in FIG. 5, the holding member support portion 45 includes a central portion 45a folded downwardly further than the front portion and the rear portion in the front to back direction, protrusions 45b formed on both ends in the right and left direction and protruding upwardly as a flange, curved portions 45c formed respectively on the front end and the rear end of the protrusion 45b and notched into a substantially circular arc shape, and a movement regulation portion 45d formed on the right outer surface behind the holding member support portion 45 and regulating movement of an engaging hook 55 described below.

The central portion 45a is formed to extend to the right and left end portions of the holding member support portion 45, and on the upper surface of the central portion 45a, the leg holding member 50 is mounted. The central portion 45a is folded along the outer shape of the leg holding member 50 and is formed into a shape for securing support rigidity of the leg holding member 50.

The protrusion 45b is formed to extend to the front and rear end portions of the holding member support portion 45, and of the protrusion 45b, the protruding amount of the portion facing the leg holding member 50 in the front to back direction is smaller than the protruding amount of the portion not facing the leg holding member 50. The curved portions 45c are formed to be notched toward the front and rear inner sides respectively in the front end portion and the rear end portion of the protrusion 45b, the first base connection portion 42 is connected to the front surface of the curved portion 45c on the front end side, and the second base connection portion 43 is connected to the rear surface of the curved portion 45c on the rear end side. Specifically, the first base connection portion 42 is abutted by the upper surface portion of the front end side of the holding member support portion 45 and the front surface of the curved portion 45c and joined thereto by welding or the like. A similar arrangement applies to the second base connection portion 43 as for the first base connection portion 42. The curved portions 45c are formed into a substantially circular arc shape along the outer shapes of the first base connection portion 42 and the second base connection portion 43, respectively, and have a shape configured to secure connection rigidity.

The leg holding member 50 is formed of a generally U-shaped clip member that detachably holds the support leg 30, and as shown in FIG. 3, is composed of a pair of side wall portions 51, and a connecting wall portion 52 connecting the lower end portions of the respective side wall portions 51. Each side wall portion 51 is folded from the lower end portion toward the upper end portion in an adjacent direction to each other, in other words, is folded in the opening inside direction to narrow the opening portion of the leg holding member 50, and on the upper end portion, a curl portion 53 warped in the opening outside direction is formed. The connecting wall portion 52 is formed into a curved shape, and is mounted along the central portion 45a of the holding member support portion 45. Specifically, the connecting wall portion 52 includes a cut and raised portion (not shown) formed by cutting and raising a portion thereof, and the cut and raised portion is mounted to the central portion 45a by latching it onto a latching groove (not shown) formed therein.

The leg holding member 50 is supported by the holding member support portion 45 at a position backwardly inclined at a predetermined angle of inclination with respect to a horizontal plane. In other words, the leg holding member 50 is supported by the holding member support portion 45 at a position in which the opening portion thereof is directed forward and obliquely upward. The leg holding member 50 is formed such that the width of the opening portion thereof is slightly narrower than the width diameter of the support leg 30, and the support leg 30 is detachably held by an elastic deformation of the leg holding member 50. In a portion adjacent to the leg holding member 50, an inertial locking device 54 is disposed.

The inertial locking device 54 is a device configured to lock the support leg 30 in a state of being held by the leg holding member 50 at the time of a front end collision of a vehicle, and as shown in FIG. 5, is mounted on the right side of the holding member support portion 45 of the support base 40. The inertial locking device 54 is disposed between the first base connection portion 42 and the second base connection portion 43 in the front to back direction, and is disposed at a position overlapping with the leg holding member 50 in the up and down direction.

The inertial locking device 54 generally includes an engaging hook 55 configured to engage with the support leg 30, a locking pivot axis 56 mounted to the lower surface of the holding member support portion 45 and pivotally supporting the engaging hook 55, and a biasing spring 57 biasing the engaging hook 55 to the direction in which engagement of the engaging hook 55 with the support leg 30 is released.

Figure 6B:
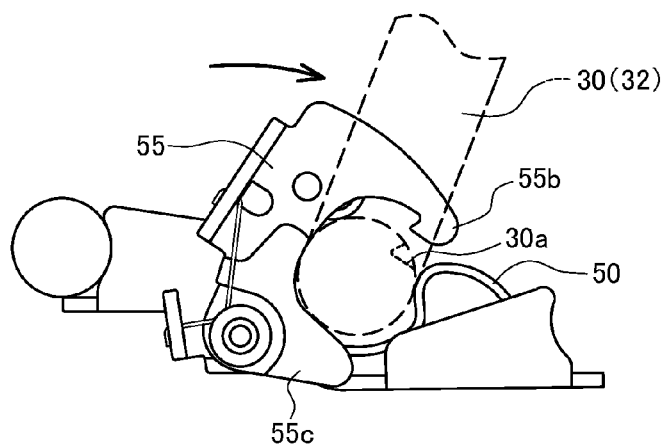

The engaging hook 55 is formed of a hook member movable between a disengaged position, in which engagement of the engaging hook 50 with the support leg 30 held by the leg holding member 50 is released as shown in FIG. 6A, and an engaged position, in which the engaging hook 55 is engaged with the support leg 30 as shown in FIG. 6B, and is formed into a substantially channel shape seen from the sides of the seat. Specifically, the engaging hook 55 is rotatably movable in the front to back direction between the disengaged position and the engaged position around the locking pivot axis 56.

As shown in FIG. 5, the engaging hook 55 includes a hook body portion 55a pivotally connected to the locking pivot axis 56 elongated in the right and left direction, an engagement portion 55b formed on the front end side than the hook body portion 55a and capable of engaging with the support leg 30, a front abutment portion 55c formed further below the engagement portion 55b on the front end side than the hook body portion 55a and capable of abutting with the support leg 30, and a rearward extending portion 55d formed on the rear side than the hook body portion 55a and extending in the right and left direction.

The engagement portion 55b is formed into a hook shape protruding to the front side, is located above the leg holding member 50 when it is in the disengaged position of FIG. 6A, and is located in a position overlapping with the leg holding member 50 in the up and down direction and disposed above the leg connection portion 32 of the lower end portion of the support leg 30 when it is in the engaged position of FIG. 6B. In addition, the engagement portion 55b is disposed at an opposed position separated from the leg connection portion 32 of the support leg 30 by a predetermined distance, in an obliquely forward direction, for example, in the detaching direction of the support leg 30 when it is in the engaged position of FIG. 6B.

The front abutment portion 55c is a portion protruding to the front side, and is located in a position overlapping with the leg holding member 50 in the up and down direction and is disposed at a position capable of abutting with the support leg 30 attached to the leg holding member 50 when it is in the disengaged position of FIG. 6A. In addition, the front abutment portion 55c is located below the leg holding member 50 and is disposed at an opposed position abutted with the leg connection portion 32 of the lower end portion of the support leg 30 when it is in the engaged position of FIG. 6B.

As shown in FIG. 5, the rearward extending portion 55d is formed of a folded portion that is formed by bending the rear end portion of the hook body portion 55a in the right and left direction, and extends in the right and left direction, thereby increasing rigidity of the rear end portion of the engaging hook 55. Then, the movement regulation portion 45d of the holding member support portion 45 is disposed behind the engaging hook 55 and regulates movement of the engaging hook 55 to the opposite side to the engaged position from the disengaged position. For example, the movement regulation portion 45d is configured to be capable of abutting with the rear end of the hook body portion 55a when it is in the disengaged position of FIG. 6A. Therefore, by the rearward extending portion 55d, rigidity of the rear end portion of the engaging hook 55 abutting with the movement regulation portion 45d is increased, and a switching movement of the engaging hook 55 is stabilized.

The biasing spring 57 is mounted to the outer peripheral surface of the locking pivot axis 56 to wrap therearound, is locked on the engaging hook 55 side at one end portion thereof, is locked on the holding member support portion 45 side at the other end portion thereof, and is configured to bias the engaging hook 55 to the disengaged position side with respect to the locking pivot axis 56.

The engaging hook 55 is disposed to be supported by the second base connection portion 43 and the holding member support portion 45 at a position backwardly inclined at a predetermined angle of inclination with respect to a horizontal plane when it is in the disengaged position of FIG. 6A. Specifically, the engaging hook 55 is biased to the disengaged position side by the biasing spring 57, and on the other hand, movement of the engaging hook 55 is regulated by abutment of the rear end thereof with the movement regulation portion 45d of the holding member support portion 45 shown in FIG. 5, so the engaging hook 55 is positioned in the disengaged position.

When the engaging hook 55 is in the disengaged position of FIG. 6A, if the support leg 30 is attached to the leg holding member 50, the support leg 30 abuts with the front abutment portion 55c and presses the front abutment portion 55c downwardly. As a result, as shown in FIG. 6B, the engaging hook 55 rotatably moves to the front side around the locking pivot axis 56 against a biasing force of the biasing spring 57, and is positioned in the engaged position so that the engagement portion 55b covers the support leg 30, in other words, the opening portion of the leg holding member 50. Then, when the engaging hook 55 is in the engaged position, if the support leg 30 is detached from the leg holding member 50, the support leg 30 and the front abutment portion 55c are separated from each other. As a result, the engaging hook 55 rotatably moves to the rear side around the locking pivot axis 56 by a biasing force of the biasing spring 57, and is positioned again in the disengaged position of FIG. 6A.

Figure 6C:
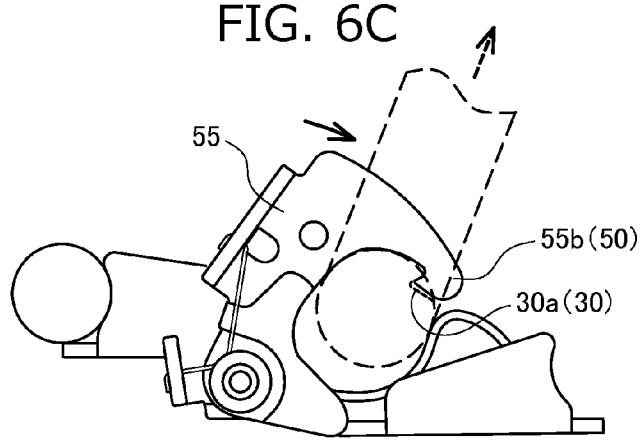
FIG. 6C is a view illustrating a state that the inertial locking device is locked at the time of a collision of a vehicle.

The engaging hook 55 is positioned in the engaged position of FIG. 6B when the seat body is in the seatable state, and that the engaging hook 55 is positioned in the disengaged position of FIG. 6A when the seat body is in the housed state or the tip-up state. In the above configuration, the inertial locking device 54 has a function of locking the support leg 30 in a state of being held by the leg holding member 50 if a front end collision of a vehicle occurs when the engaging hook 55 is in the engaged position of FIG. 6B. For example, if the engaging hook 55 receives an impact load by a front end collision of a vehicle, an inertial force acts in the moving direction of the engaging hook 55 toward the engaged position side against a biasing force of the biasing spring 55. Then, as shown in FIG. 6C, the engaging hook 55 moves to a position in which detachment of the support leg 30 from the leg holding member 50 is regulated.

For the outer surface of the lower end portion of the support leg 30, in a portion facing the engagement portion 55b of the engaging hook 55 in the right and left direction, an engaging groove portion 30a is formed. As shown in FIG. 6C, the engaging hook 55 is configured such that the engagement portion 55b engages with the engaging groove portion 30a at the time of a front end collision of a vehicle, and can regulate detachment of the support leg 30 from the leg holding member 50. Specifically, due to a front end collision of a vehicle, the engaging hook 55 moves forwardly from the engaged position of FIG. 6B to the detachment regulated position of FIG. 6C, upon receiving an inertial force acting in the front of the seat. On the other hand, the support leg 30 moves similarly to the forward direction, that is, the direction in which the support leg 30 is detached from the leg holding member 50, upon receiving an inertial force acting in the front of the seat. As a result, the engagement portion 55b of the engaging hook 55 and the engaging groove portion 30a of the support leg 30 are engaged. After a collision of a vehicle, the engaging hook 55 and the support leg 30 return to the engaged position shown in FIG. 6B.

More specifically, the engagement portion 55b is located above the engaging groove portion 30a of the support leg 30 and is disposed in a position overlapping with the engaging groove portion 30a in the front to back direction when it is in the engaged position of FIG. 6B. By such an arrangement, in the engaged position, the engagement portion 55b and the engaging groove portion 30a are not engaged when the support leg 30 will be detached from the leg holding member 50, thereby capable of easily switching from the seatable state to the housed state or the tip-up state. On the other hand, as shown in FIG. 6C, the engagement portion 55b is located above the engaging groove portion 30a of the support leg 30 and is disposed in the forward position than the engaging groove portion 30a in the front to back direction, at the time of a collision of a vehicle. As a result, when the engaging hook 55 is in the position of FIG. 6C, the engagement portion 55b and the engaging groove portion 30a are engaged when the support leg 30 will be detached from the leg holding member 50, so the seatable state is stably maintained without detachment of the support leg 30.

The base cover 60 is a resin member covering the entire support base 40 from above, and as shown in FIG. 1, includes a guide portion 61 in the front portion that guides the rotational motion of the support leg 30. The guide portion 61 is formed into a concave shape recessed toward the lower side from the upper surface of the base cover 60, and is composed of an inclined portion 61a downwardly inclined from the front end portion thereof to the rear, and an opening 61b formed in the bottom surface portion continuous from the inclined portion 61a. The leg holding member 50 is latched onto the guide portion 61 such that the curl portion 53 thereof exposes to the outside from the opening 61b, thereby being mounted to the base cover 60. The support leg 30 is configured to be guided to the inclined portion 61a of the guide portion 61 and be capable of attaching to the leg holding member 50 exposed from the opening 61b.

Housing Operation of Seat

Next, the operation of moving the vehicular seat S from the seatable state to the housed state is described with reference to FIG. 7 and FIG. 8. FIG. 5 and FIG. 6 show the reclining device 13, the cushion locking device 25, and the leg locking device 26 in a locked state by a black circle and show the same in a released state by a white circle. The same applies to FIG. 7 and FIG. 8.

Figure 7A:
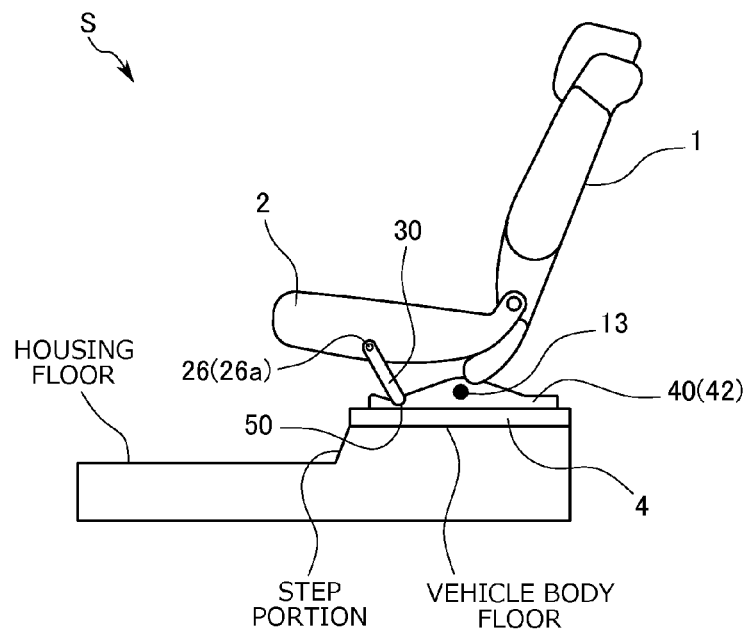
FIG. 7A and FIG. 7B are side views of the vehicular seat, and illustrate a moving operation from a seatable state to a housed state.

When the vehicular seat S is in the seatable state shown in FIG. 7A, the seat back 1 is supported by the support base 40 and locked to a rising state by the reclining device 13, and the seat cushion 2 is supported by the support leg 30 held by the leg holding member 50. The leg pivot axis 26a in the upper end portion of the support leg 30 is disposed in the front of the seat than the leg holding member 50 in the seatable state. In addition, the front end portion of the seat cushion 2 is disposed in the front than the first base connection portion 42 in the seatable state.

Figure 7B:
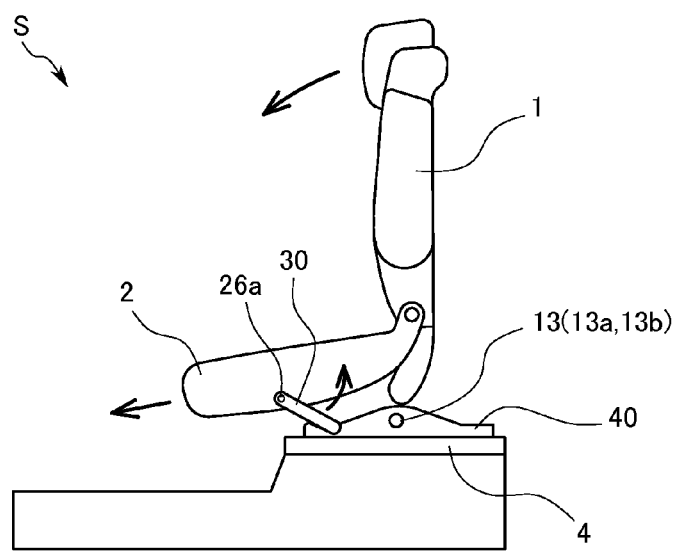

When moving the vehicular seat S from the seatable state to the housed state, an operating lever (not shown) provided on the upper surface of the seat back 1 is operated, for example. As shown in FIG. 7B, upon operating the operating lever by an occupant, the locked state of the reclining device 13 is released, and the seat back 1 begins rotation to the seat front side around the back pivot axis 13a to move the seat cushion 2 to the housing floor by a biasing force of the spiral spring 13b. The support leg 30 begins rotation to the side of the seat cushion 2 around the leg pivot axis 26a with respect to the seat cushion 2 in conjunction with the rotation of the seat back 1. At this time, the support leg 30 is in a stretched state between the seat cushion 2 and the vehicle body floor side, thereby capable of stably moving the seat cushion 2 and the seat back 1. A known cable (not shown) is connected between the operating lever and the reclining device 13 and the cable is pulled by operation of the operating lever, thereby releasing the locked state.

Figure 8A:
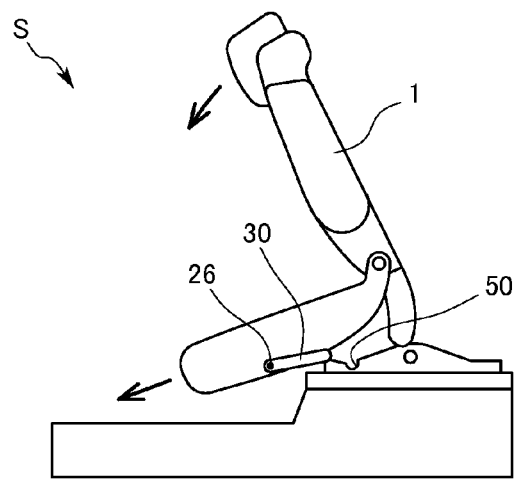
FIG. 8A, FIG. 8B, and FIG. 8C are side views of the vehicular seat, and illustrate a moving operation to the housed state.

As shown in FIG. 8A, when the seat back 1 reaches a predetermined rotational position, the support leg 30 is detached from the leg holding member 50. In other words, the support leg 30 is detached from the leg holding member 50 when it reaches the predetermined rotational position in conjunction with the rotation of the seat back 1. The detached support leg 30 rotates to be folded to the side of the seat cushion 2 around the leg pivot axis 26a against a biasing force of the spring member 26b, by the leg locking device 26. Then, the support leg 30 is locked in a state of being housed in the side of the seat cushion 2.

Figure 8B:
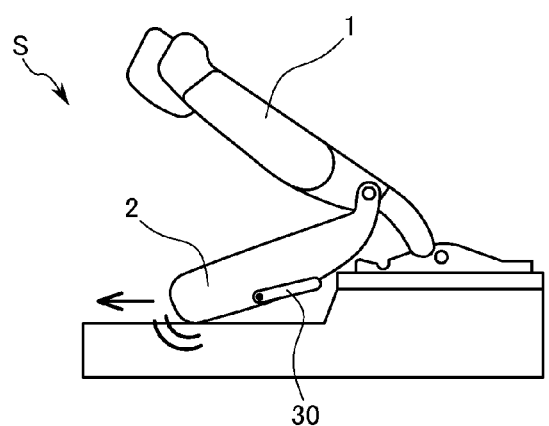
Figure 8C:
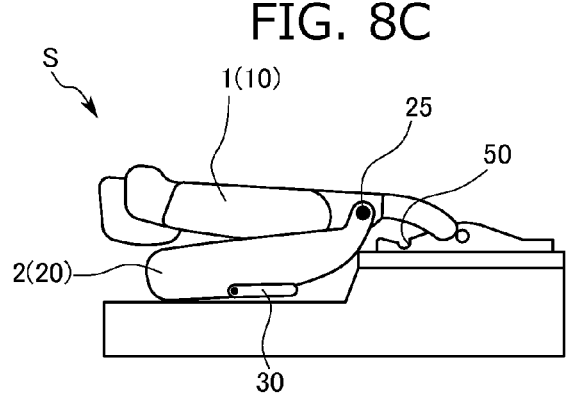

Further, as shown in FIG. 8B, when the seat back 1 reaches to a predetermined rotational position, the front end portion of the seat cushion 2 abuts to the housing floor surface earlier than the support leg 30. To the front and rear end portions of the seat cushion 2, sliding members (not shown) slidable with respect to the housing floor surface are mounted, and the seat cushion 2 can stably slide on the housing floor surface toward the seat front side in association with the rotation of the seat back 1. It should be noted that the sliding member may be mounted to at least one of the front and rear end portions of the seat cushion 2.

As shown in FIG. 8C, by a series of operations described above, the seat body is housed in the housing floor, and the vehicular seat S is switched to the housed state. The seat cushion 2 is locked by the cushion locking device 25, in the housed state, concretely, in a state that the seat back 1 is folded to the side of the seat cushion 2. The support leg 30 is disposed at a position lower than the leg holding member 50 in the housed state.

Tip-up Operation of Seat

Figure 9A:
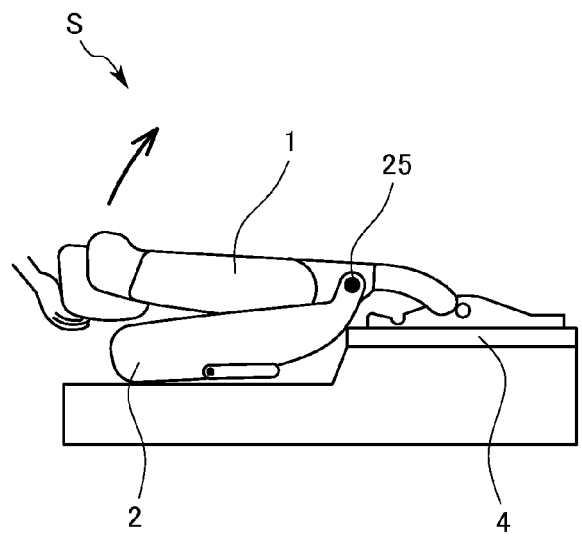
FIG. 9A and FIG. 9B are side views of the vehicular seat, and illustrate a moving operation from the housed state to a tip-up state.
Figure 9B:
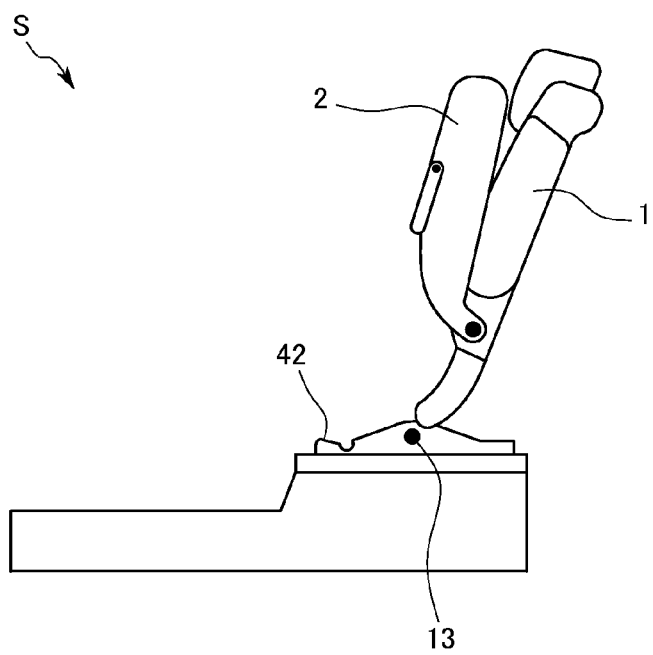

Next, the operation of moving the vehicular seat S from the housed state to the tip-up state is described with reference to FIG. 9. When the vehicular seat S is in the housed state shown in FIG. 9A, for example, the occupant raises the seat body upward manually, thereby the vehicular seat S is switched to the tip-up state shown in FIG. 9B. At this time, the cushion locking device 25 locks the pivot motion of the seat cushion 2, so it is possible to raise the seat cushion 2 upward integrally by raising the seat back 1 upward. The support leg 30 is disposed behind than the first base connection portion 42 in the tip-up state. In the tip-up state, it is possible to secure a larger space (e.g., for luggage) in front of the vehicular seat S by sliding the upper rails 4b to the seat rear side with respect to the lower rails 4a. When the vehicular seat S switches to the tip-up state shown in FIG. 9B, the seat back 1 returns to the same position as the position in the seatable state, and is locked in the rising state by the reclining device 13.

Return Operation of Seat

Figure 10A:
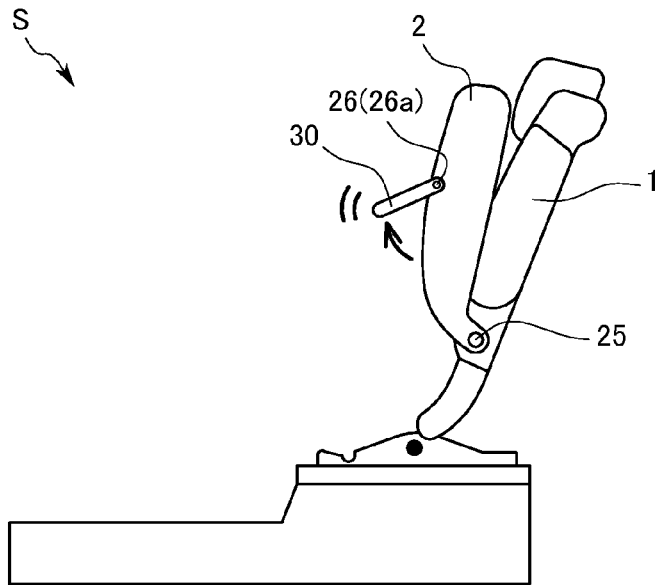
FIG. 10A and FIG. 10B are side views of the vehicular seat, and illustrate a return operation from the tip-up state to the seatable state.

Next, the operation of moving the vehicular seat S from the tip-up state to the seatable state is described with reference to FIG. 10. As shown in FIG. 10A, when moving the vehicular seat S from the tip-up state to the housed state, for example, the support leg 30 is operated as an operating lever. An occupant pulls the support leg 30 to be rotated upwardly around the leg pivot axis 26a, in other words, pulls the support leg 30 in the direction away from the cushion frame 20, thereby releasing the locked state of the cushion locking device 25 and the leg locking device 26. A known cable (not shown) is connected between the support leg 30 and the cushion locking device 25 and the cable is pulled by operation of the support leg 30, thereby releasing the locked state.

Figure 10B:
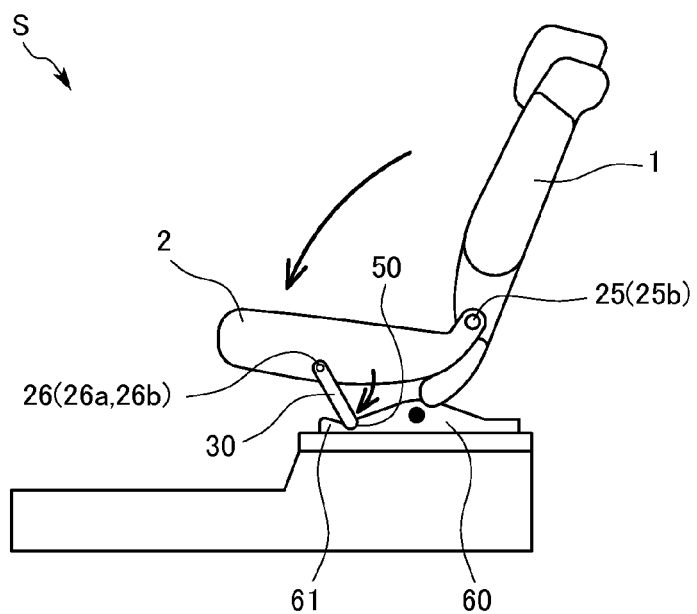

As shown in FIG. 10B, the seat cushion 2 is rotated downwardly with respect to the seat back 1 by a biasing force of the spiral spring 25b in association with release of the cushion locking device 25. The support leg 30 is rotated around the leg pivot axis 26a to a position in which the support leg 30 can be attached to the leg holding member 50 by a biasing force of the spring member 26b in association with release of the leg locking device 26, thereby being attached to the leg holding member 50. By a series of operations described above, the vehicular seat S returns to the seatable state shown in FIG. 10B.

Other Embodiments

In the above embodiment, the housing floor is formed in front of the vehicular seat S as shown in FIG. 7, but not limited thereto, the housing floor may be formed behind the vehicular seat S.

In the above embodiment, the rail device 4 includes a locking member (not shown) locking the upper rails 4b so as not to slide and an operating member (not shown) releasing the locked state of the locking member. Then, as shown in FIG. 3, the operating member may be disposed behind the second base connection portion 43 of the support base 40. By such a configuration, an empty space can be more effectively utilized. In the empty space behind the second base connection portion 43, an operating member configured to change at least one of a position of the seat back 1 or a position of the seat cushion 2 in the seatable state can be separately disposed.

In the above embodiment, the cushion locking device 25 can be switched to the locked state in which the pivot motion of the seat cushion 2 is locked when it is in the housed state as shown in FIG. 8C, but other embodiments are not limited thereto. For example, the cushion locking device 25 may be switched to the locked state in the tip-up state shown in FIG. 9B.

In the above embodiment, the support leg 30 is rotated backwardly around the leg pivot axis 26a with respect to the seat cushion 2 and housed in the side of the seat cushion 2 when switched from the seatable state to the housed state, but other embodiments are not limited thereto. For example, the support leg 30 may be rotated forwardly around the leg pivot axis 26a and housed in the side of the seat cushion 2. At this time, if the upper end portion of the support leg 30 is disposed in the seat rear side further than the lower end portion of the support leg 30 and downwardly inclined to the rear from the lower end portion side of the support leg 30 toward the upper end portion side of the support leg 30, the support leg 30 is facilitated to be housed and rotated in the side of the seat cushion 2 favorably.

In the above embodiment, the support base 40 is fixed to the vehicle body floor via the rail devices 4 as shown in FIG. 2, but other embodiments are not limited thereto. For example, the support base 40 may be appropriately changed to be provided directly to the vehicle body floor without the rail devices 4. In addition, the support base 40 supports the seat back 1 pivotally via the connecting bracket 11 as shown in FIG. 2, but it may be appropriately changed. For example, as another embodiment, the support base 40 may support the seat back 1 indirectly via the seat cushion 2, and the seat back 1 may be pivotally connected to the seat cushion 2.

In the above embodiment, the support base 40 includes the base mounting portions 44f for mounting the side base portions 41 and the reinforcing base portions 44 as shown in FIG. 3, and the base mounting portions 44f are mounted by fastening bolts, but other embodiments are not limited thereto. For example, the base mounting portions 44f may be mounted by a known method such as welding, adhesives or the like. In addition, in a portion located between the plurality of base mounting portions 44f, a convex portion 44h projecting upwardly is formed to extend in the right and left direction, but other embodiments are not limited to this shape and arrangement. For example, the convex portion 44h may project downwardly or may be formed to extend in the front to back direction.

In the above embodiment, for the reinforcing base portion 44, on a portion in contact with the second base connection portion 43, the protrusion 44g projecting upwardly along the outer surface of the second base connection portion 43 is formed, but other embodiments are not limited thereto. For example, the shape and arrangement of the protrusion 44g can be appropriately changed as long as it is formed along the outer surface of the second base connection portion 43.

In the above embodiment, the movement regulation portion 45d of the holding member support portion 45 is a portion for regulating movement of the engaging hook 55 as shown in FIG. 5, but other embodiments are not limited thereto. For example, the second base connection portion 43 of the support base 40 may be a portion for regulating the movement of the engaging hook 55 instead. For example, the second base connection portion 43 and the rearward extending portion 55d of the engaging hook 55 may be configured to be capable of abutting in the front to back direction. By such a configuration, the abutting area of the engaging hook 55 and the portion functioning as the movement regulation portion is increased, thereby further stabilizing the switching movement of the engaging member.

In the above embodiment, the leg holding member 50 is disposed further in the seat rear side than a step portion connected to the housing floor, of the vehicle body floor, as shown in FIG. 7. By such a configuration, the support leg 30 held by the leg holding member 50 can be compactly disposed. In addition, the support leg 30 is configured to support the substantially central portion in the front to back direction of the seat cushion 2, thereby capable of increasing support rigidity of the seat cushion 2. Generally, the vehicle body floor includes the step and does not include the housing floor.

In the above embodiment, the inertial locking device 54 comprises a device locking the support leg 30 in a state of being held by the leg holding member 50 at the time of a front end collision of a vehicle, but other embodiments are not limited thereto. For example, the inertial locking device 54 may comprise a device locking the support leg 30 at the time of a rear end collision of a vehicle. For example, the inertial locking device 54 is disposed in the seat rear side of the support leg 30 for at the time of a front end collision, but in order to use it at the time of a rear end collision, the inertial locking device 54 may be disposed in the seat rear side of the support leg 30 by inverting it on the support leg 30 as a boundary. Further, instead of the second base connection portion 43, the first base connection portion 42 may function as the movement regulation portion of the engaging hook 55. By such a configuration, the inertial locking device 54 can be mounted to the seat for at the time of a rear end collision of a vehicle. Then, both inertial locking devices for at the time of a front end collision and for at the time of a rear end collision may be included.

In the above embodiment, the inertial locking device 54 comprises a device locking the support leg 30 in a state of being held by the leg holding member 50 at the time of a front end collision of a vehicle, but other embodiments are not limited thereto. For example, the inertial locking device 54 may be configured as a device capable of locking the support leg 30 by an operation of an occupant. By such a configuration, an operation of locking the support leg is possible when the seat body is in the seatable state, thereby an occupant can stably sit on the seat body.

In the above embodiment, the inertial locking device 54 is mounted to the holding member support portion 45 of the support base 40, but may be mounted within the vehicular seat S. In the description herein, "within the vehicular seat S" includes all portions mounted in the vehicular seat S or on the vehicular seat S.

In the above embodiment, the vehicular seat capable of housing a seat back and a seat cushion in a housing floor used for automobiles has been described as an example, but other embodiments are not limited thereto. For example, the vehicular seat can be used as a seat for other vehicles such as aircrafts and ships, in addition to vehicular seats for trains, busses and the like.

In the present disclosure, the vehicular seat S according to various embodiments has been described. However, the above embodiments are merely examples to facilitate understanding of the invention, and the invention is not limited thereto. The invention can be changed and improved without departing from the gist thereof, and as a matter of course, the invention includes equivalents thereof. In particular, the shape, arrangement, and configuration of the support leg 30, the support base 40, and the leg holding member 50 described in the above embodiments are merely examples, and the invention is not limited thereto.

TABLE OF REFERENCE NUMERALS

S: Vehicular seat
1: Seat back
  1a, 2a, 3a: Cushion pad
  1b, 2b, 3b: Skin
2: Seat cushion
3: Headrest
4: Rail device
  4a: Lower rail
  4b: Upper rail
  4c: Lower rail fixed portion
10: Back frame
11: Connecting bracket
  11a: Outer bracket portion
  11b: Inner bracket portion
12: Back pivot axis
13: Reclining device
  13a: Back pivot axis
  13b: Spiral spring
20: Cushion frame
21: Side frame
22: Front connecting pipe
23: Central connecting pipe
24: Pan frame
25: Cushion locking device
  25a: Cushion pivot axis
  25b: Spiral spring
26: Leg locking device
  26a: Leg pivot axis
  26b: Spring member
30: Support leg
  30a: Engaging groove portion
31: Leg body portion
32: Leg connection portion
40: Support base
41: Side base portion
  41a: Connecting wall portion
  41b: Inner wall portion
  41c: Outer wall portion
  41d, 41e: Flange portion
  41f: Notch
42: First base connection portion
43: Second base connection portion
44: Reinforcing base portion
  44a: Connecting wall portion
  44b: Inner wall portion
  44c: Outer wall portion
  44d, 44e: Flange portion
  44f: Base mounting portion
  44g: Protrusion
  44h: Convex portion
45: Holding member support portion
  45a: Central portion
  45b: Protrusion
  45c: Curved portion
  45d: Movement regulation portion
50: Leg holding member
51: Side wall portion
52: Connecting wall portion
53: Curl portion
54: Inertial locking device
55: Engaging hook
  55a: Hook body portion
  55b: Engagement portion
  55c: Front abutment portion
  55d: Rearward extending portion
56: Locking pivot axis
57: Biasing spring
60: Base cover
61: Guide portion
  61a: Inclined portion
  61b: Opening

The invention claimed is:

1. A vehicular seat configured to house a seat back and a seat cushion connected to the seat back in a housing floor provided in a position lower than a vehicle body floor, the vehicular seat comprising:

a support base connected to the vehicle body floor and to which a lower end side of the seat back is connected;

a support leg having i) an upper end side mounted to the seat cushion and ii) a lower end side connectable to the support base; and a leg holding member that i) is mounted to the support base, and ii) detachably holds the lower end side of the support leg, wherein the seat back is connected to the support base via right and left connecting brackets respectively disposed on right and left sides of the seat back, each of the right and left connecting brackets having a first end side mounted to a corresponding lower end side of the seat back and a second end side pivotally connected to the support base.

2. The vehicular seat according to claim 1, wherein
the support base comprises right and left side base portions to which the right and left connecting brackets are respectively mounted, a first base connection portion that connects the right and left side base portions, and a second base connection portion that connects the right and left side base portions at a position behind the first base connection portion, and
the leg holding member is disposed between the first base connection portion and the second base connection portion in a front to back direction of the vehicular seat.

3. The vehicular seat according to claim 2, wherein the first base connection portion and the second base connection portion extend in a seat width direction and are disposed substantially parallel to each other.

4. The vehicular seat according to claim 2, wherein the support base comprises a holding member support portion which extends in the front to back direction of the vehicular seat to connect the first base connection portion and the second base connection portion and to which the leg holding member is mounted.

5. The vehicular seat according to claim 2, wherein
the support base comprises right and left reinforcing base portions respectively mounted on upper sides of the right and left side base portions, and
the right and left side base portions and the right and left reinforcing base portions form respective closed section structures.

6. The vehicular seat according to claim 5, wherein
the support base comprises a plurality of base mounting portions that mount the right and left side base portions and the right and left reinforcing base portions, and
the right and left reinforcing base portions comprise respective right and left convex portions that project in an up and down direction of the vehicular seat and are disposed in portions of the right and left reinforcing base portions located between the plurality of base mounting portions.

7. The vehicular seat according to claim 5, wherein
the right and left reinforcing base portions sandwich the first base connection portion and the second base connection portion with the right and left side base portions,
the right and left reinforcing base portions comprise respective protrusions that project in the up and down direction along an outer surface of the second base connection portion and are disposed in a portion of the right and left reinforcing base portions in contact with the second base connection portion, and
the right and left protrusions extend to an outer end portion of a seat width direction.

8. The vehicular seat according to claim 5, wherein
the right and left side base portions are connected to a lower portion of the first base connection portion, and the right and left reinforcing base portions are connected to an upper portion of the first base connection portion.

9. The vehicular seat according to claim 7, wherein the right and left protrusions of the right and left reinforcing base portions extend to a position that does not overlap with the leg holding member in the seat width direction.

10. The vehicular seat according to claim 5, wherein
a back pivot axis that serves as a pivot axis of the seat back is pivotally supported on the support base in a seat width direction,
the back pivot axis is connected to the lower end side of the seat back by the right and left connecting brackets and pivotally supported on the right and left reinforcing base portions in the seat width direction,
a side base portion of the right and left side base portions is disposed outside in the seat width direction of a reinforcing base portion of the right and left side base portions, and
the side base portion has a notch in a portion of the side base portion that faces the back pivot axis.

11. The vehicular seat according to claim 1, comprising:
right and left lower rails that are fixed to the vehicle body floor and extend in a front to back direction of the vehicular seat; and
right and left upper rails slidably supported along the lower rails, wherein the support base is disposed between the right and left upper rails and a back pivot axis that serves as a pivot axis of the seat back is mounted thereto.

12. The vehicular seat according to claim 11, wherein the leg holding member is disposed behind in the front to back direction of the vehicular seat as compared to front end portions of the right and left upper rails.

13. The vehicular seat according to claim 1, further comprising a locking device mounted within the vehicular seat and configured to lock the support leg in a state of being held by the leg holding member.

14. The vehicular seat according to claim 13, wherein the locking device is mounted to the support base and is disposed between a front end and a rear end of the support base.

15. The vehicular seat according to claim 13, wherein
the support base comprises right and left side base portions which are disposed on sides of the seat back and to which lower end sides of the seat back are connected, a first base connection portion that connects the right and left side base portions, and a second base connection portion that connects the right and left side base portions at a position behind the first base connection portion, and
the locking device is disposed between the first base connection portion and the second base connection portion.

* * * * *